United States Patent
Wang

(10) Patent No.: US 12,255,321 B2
(45) Date of Patent: Mar. 18, 2025

(54) METHOD FOR PREPARING FERROBORON ALLOY-COATED LITHIUM IRON PHOSPHATE

(71) Applicant: HUBEI WANRUN NEW ENERGY TECHNOLOGY CO., LTD., Hubei (CN)

(72) Inventor: Qin Wang, Hubei (CN)

(73) Assignee: HUBEI WANRUN NEW ENERGY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 18/259,852

(22) PCT Filed: Dec. 9, 2022

(86) PCT No.: PCT/CN2022/137775
§ 371 (c)(1),
(2) Date: Jun. 29, 2023

(87) PCT Pub. No.: WO2023/179100
PCT Pub. Date: Sep. 28, 2023

(65) Prior Publication Data
US 2025/0006898 A1    Jan. 2, 2025

(30) Foreign Application Priority Data

Mar. 24, 2022 (CN) .......................... 202210294927.5

(51) Int. Cl.
*C01B 25/37* (2006.01)
*B22F 1/18* (2022.01)
(Continued)

(52) U.S. Cl.
CPC ............... *H01M 4/366* (2013.01); *B22F 1/18* (2022.01); *C01B 25/30* (2013.01); *C01B 25/375* (2013.01);
(Continued)

(58) Field of Classification Search
CPC .......... C01B 25/375; B22F 1/18; H01M 4/366
See application file for complete search history.

(56) References Cited

U.S. PATENT DOCUMENTS

| 3,030,284 | A | * | 4/1962 | Stern | ..................... C01B 35/023 |
| | | | | | 205/410 |
| 9,281,516 | B2 | | 3/2016 | Zhou | |
| 2012/0321958 | A1 | * | 12/2012 | Chou | ..................... H04M 4/52 |
| | | | | | 423/311 |

FOREIGN PATENT DOCUMENTS

| CN | 101621122 | | 1/2010 |
| CN | 101621122 | A | 1/2010 |

(Continued)

OTHER PUBLICATIONS

CN113151775A translation (Year: 2021).*
(Continued)

*Primary Examiner* — Cachet I Proctor

(57) ABSTRACT

The present disclosure relates to a method for preparing ferroboron alloy-coated lithium iron phosphate, comprising: preparing ferrous phosphate and lithium phosphate, then mixing ferrous phosphate and lithium phosphate and adding a hydrazine hydrate solution to obtain a mixture which is then subjected to grinding, drying and then calcining to obtain a calcined material, adding pure water to the calcined material and grinding the calcined material in water to obtain a slurry, to which PEG, ferrous sulfate crystals and disodium EDTA are added and stirred to dissolve, then adding a sodium borohydride solution and a sodium hydroxide solution while stirring and maintaining a pH in the process at 8.5-10.5, reacting for 15-30 min to obtain a product, and filtering, washing and vacuum drying the product to obtain the ferroboron alloy-coated lithium iron phosphate. The method may reduce interface resistance while improving conductivity, corrosion resistance, oxidation resistance and density of the product.

10 Claims, 2 Drawing Sheets

(51) Int. Cl.
  *C01B 25/30* (2006.01)
  *C01B 25/45* (2006.01)
  *H01M 4/36* (2006.01)
  *H01M 4/38* (2006.01)
  *H01M 4/58* (2010.01)

(52) U.S. Cl.
  CPC .............. *C01B 25/45* (2013.01); *H01M 4/38* (2013.01); *H01M 4/5825* (2013.01); *B22F 2301/35* (2013.01); *B22F 2303/30* (2013.01); *C01P 2004/03* (2013.01); *C01P 2004/61* (2013.01); *C01P 2004/62* (2013.01); *C01P 2004/64* (2013.01); *C01P 2006/11* (2013.01); *C01P 2006/12* (2013.01); *C01P 2006/40* (2013.01)

(56) References Cited

FOREIGN PATENT DOCUMENTS

| CN | 102079530 | A | * | 6/2011 | | |
|---|---|---|---|---|---|---|
| CN | 102255074 | | | 11/2011 | | |
| CN | 102255074 | A | | 11/2011 | | |
| CN | 102544508 | | | 7/2012 | | |
| CN | 102867949 | | | 1/2013 | | |
| CN | 103545508 | A | * | 1/2014 | ........... | C01B 35/128 |
| CN | 104091950 | | | 10/2014 | | |
| CN | 109301216 | | | 2/2019 | | |
| CN | 109301216 | A | | 2/2019 | | |
| CN | 111547698 | A | * | 8/2020 | | |
| CN | 111952547 | | | 11/2020 | | |
| CN | 111952547 | A | | 11/2020 | | |
| CN | 113151775 | A | * | 7/2021 | | |
| CN | 114649518 | | | 6/2022 | | |
| CN | 114649518 | A | | 6/2022 | | |
| JP | 2019192513 | | | 10/2019 | | |
| JP | 2019192513 | A | | 10/2019 | | |

OTHER PUBLICATIONS

CN102079530 translation (Year: 2012).*
CN103545508 translation (Year: 2012).*
CN111547698 translation (Year: 2020).*
International Search Report (ISR) for PCT/CN2022/137775 dated Feb. 15, 2023, pp. 1-3.
International Search Report for PCT/CN2022/137775, mailed Feb. 22, 2023 (with English Translation).

* cited by examiner

METHOD FOR PREPARING FERROBORON ALLOY-COATED LITHIUM IRON PHOSPHATE

The present application is a U.S. national phase of International Application No. PCT/CN2022/137775, filed on Dec. 9, 2022, which claims the priority of Chinese invention patent application No. 202210294927.5 filed on Mar. 24, 2022, entitled "Method for preparing ferroboron alloy-coated lithium iron phosphate", the disclosure of which is incorporated by reference herein.

TECHNICAL FIELD

The present disclosure is directed to the technical field of solid-state batteries, and to a method for preparing ferroboron alloy-coated lithium iron phosphate.

BACKGROUND

In recent years, with the rapid development of portable electronic devices as well as electric and hybrid vehicles, research on rich energy storage materials which are energy-efficient and environment-friendly has become an international research hotspot. In order to meet massive market demands, it is far from enough to evaluate materials of a battery merely based on electrical performances of the battery, and safety, manufacturing costs and energy consumption of the batteries, as well as whether the batteries cause environmental pollution have become important indicators for evaluating battery materials.

Unlike the presently prevail lithium-ion batteries and lithium-ion polymer batteries, solid-state batteries, as one of battery technologies, utilizes solid electrodes and solid electrolytes. Since scientists believe that lithium-ion batteries have reached their limits, solid-state batteries have been regarded as a successor of the lithium-ion batteries in recent years. In the solid-state lithium battery technology, glass compounds made of lithium and sodium are adopted as conductive materials to replace electrolytes of the conventional lithium batteries, thereby greatly improving the energy density of the lithium batteries.

Solid-state batteries adopt the same principle as above, except that their electrolytes are solid and have a density and structure that allows more charged ions to gather at one end to conduct greater current, thus increasing battery capacity. As a result, the solid-state batteries are smaller in size with respect to the same amount of power. In addition, with the absence of liquid electrolytes in the solid-state batteries, it's easier for the solid-state batteries to be sealed and stored, and additional cooling tubes and electronic elements are not required for deploying the solid-state batteries in large equipment such as automobiles, thereby saving costs and effectively reducing weight.

The problem with solid-state batteries is that the solid electrolyte results in high interface impedance and inferior interface compatibility between electrodes.

For the research and development of all-solid-state batteries, the key of solving the above problems lies in the development of solid-state electrolyte materials and the regulation and optimization of their interface properties.

A composite electrode, which is generally used as the positive electrode of an all-solid-state lithium secondary battery, includes, in addition to electrode active materials, a solid electrolyte and a conductive agent for transporting ions and electrons simultaneously in the electrode. Research has been focused on $LiCoO_2$, $LiFePO_4$, and $LiMn_2O_4$, and in particular, conventional carbon-coated lithium iron phosphate. However, amorphous carbon has a very low compacted density due to the presence of a large number of loose porous structures, which, when compacted, will rebound. Due to the smaller contact interface and hence larger interface resistance between positive electrode materials and solid-state electrolytes in solid-state batteries, conventional conductive materials cannot meet the requirements of solid-state batteries. Moreover, since solid-state electrolytes avoid the problem of decomposition of corrosive gases, research on metal element-coated lithium iron phosphate positive electrode materials has been conducted, e.g., in the below examples.

Chinese patent No. 201710370271.X discloses a method for preparing a tungsten-coated lithium iron phosphate positive electrode material. The method includes steps of: preparing a lithium iron phosphate material; preparing a coating solution by dissolving a tungsten-containing compound in deionized water, and stirring the solution sufficiently to completely dissolve and uniformly disperse the tungsten-containing compound; (3) coating the lithium iron phosphate material by adding the prepared coating solution and the above spherical lithium iron phosphate positive electrode material into a ball mill tank, and mixing and grinding the mixture at a speed of 300-500 r/min for 4-6 hours to obtain a mixed solution; drying the ground mixed solution in vacuum, then raising the temperature from room temperature to 480-620° C. at a rate of 15° C./min, pre-calcining the mixture at a constant temperature of 480-620° C. for 3-6 hours, then raising the temperature to 850-900° C. at a rate of 10° C./min and calcining the mixture at a constant temperature of 850-900° C. for 8-10 hours, finally cooling down to room temperature at a constant rate of 5° C./min, and grinding the product sufficiently to obtain the tungsten-coated lithium iron phosphate positive electrode material. In this approach which uses tungsten metal to coat lithium iron phosphate, the elementary substance of the metal is easily eroded by electrolytes, and the metal coating is easily deposited on the negative electrode due to electric potential.

Chinese patent No. 201510227614.8 discloses a method for preparing a nickel-coated lithium iron phosphate positive electrode material, which is composed of lithium iron phosphate with a nickel coating on the surface. The method for preparing the material includes: subjecting lithium iron phosphate to sensitization, activation, reduction treatment in sequence in the presence of a dispersant, and coating it with nickel; then heat treating the nickel-coated lithium iron phosphate to obtain the nickel-coated lithium iron phosphate positive electrode material. This method has simple operations, mild process conditions and low cost; and the resulting nickel-coated lithium iron phosphate positive electrode material has a uniform nickel coating, a stable structure, and is useful for preparing lithium-ion batteries having good electrical conductivity, a high specific capacity, and a high power density. In this approach which uses nickel metal to coat lithium iron phosphate, the elementary substance of the metal is easily eroded by electrolytes, and the metal coating is easily deposited on the negative electrode due to electric potential.

Chinese Patent No. 201110190384.4 discloses a transition metal element-doped and transition metal oxide-coated lithium iron phosphate composite positive electrode material and a method for preparing the same. The method includes steps of: 1) ball-milling, drying, and calcining in an inert atmosphere a mixture of a lithium source, an iron source, a phosphorus source and a transition metal element at an atomic ratio of Li:Fe:PO4:M=0.995-0.95:1:1:0.005-0.05, to obtain a transition metal element-doped lithium iron phosphate composite material; and 2) mixing, ball-milling, and calcining in an inert atmosphere a mixture of the transition metal element-doped lithium iron phosphate composite material obtained from step 1) and transition metal oxide, to obtain the transition metal element-doped and transition metal oxide-coated lithium iron phosphate composite positive electrode material. The beneficial effect of this disclosure is: the specific capacity and cycle performance of lithium iron phosphate are improved through the doping of transition metal element and the coating of transition metal oxide. However, the metal oxide-coated positive electrode material prepared by this method has the problem of having relatively low electrical conductivity.

In view of the above, there is need for further study on metal element-coated lithium iron phosphate positive electrode materials.

SUMMARY

In order to solve the above problems in the prior art, the present disclosure proposes a method for preparing ferroboron alloy-coated lithium iron phosphate, which reduces interface resistance while improving conductivity, corrosion resistance, oxidation resistance and density of the product.

The present disclosure is achieved through the following technical schemes.

The method for preparing the above ferroboron alloy-coated lithium iron phosphate includes: preparing ferrous phosphate and lithium phosphate, respectively, then mixing the ferrous phosphate and the lithium phosphate as prepared and adding a hydrazine hydrate solution to obtain a mixture which is then subjected to grinding, drying and then calcining to obtain a calcined material, adding pure water to the calcined material and grinding the calcined material in water to obtain a slurry, to which PEG, ferrous sulfate crystals and disodium EDTA are added and stirred to dissolve, then adding a sodium borohydride solution and a sodium hydroxide solution while stirring and maintaining a pH in the process at 8.5-10.5, reacting for 15-30 min to obtain a product, and filtering, washing and vacuum drying the product to obtain the ferroboron alloy-coated lithium iron phosphate.

The method for preparing the ferroboron alloy-coated lithium iron phosphate includes specific steps of:

step 1: preparation of ferrous phosphate, which includes:
adding ferrous sulfate, urea, phosphoric acid, ammonium dihydrogen phosphate, and hydrazine hydrate together into a sealed reactor to obtain a solution, maintaining a pH of the solution at 1.5-2, and then introducing nitrogen to make an oxygen content in the sealed reactor lower than 1000 ppm; heating up to reach a temperature of 100-110° C. while stirring the solution, reacting at the temperature for 30-60 min while stirring, then releasing pressure and cooling down so that a material temperature is lower than 50° C., discharging, filtering and washing the material to obtain a ferrous phosphate precipitate;

step 2: preparation of lithium phosphate, which includes:
adding P204 extractant to sulfonated kerosene and mixing them well to obtain an extractant solution, then preparing a lithium hydroxide solution and mixing the lithium hydroxide solution and the extractant solution to obtain a P204-lithium soap, to which a phosphoric acid solution is then added, and stirring and mixing the P204-lithium soap and the phosphoric acid solution to obtain a lithium phosphate precipitate and a P204 extractant solution, which are then subjected to centrifugation to obtain a lithium phosphate precipitate, and washing and drying the lithium phosphate precipitate to obtain lithium phosphate;

step 3: mixing the ferrous phosphate and the lithium phosphate as prepared and adding a hydrazine hydrate solution to obtain a mixture, and grinding the mixture in a sand mill to obtain a slurry having a particle size of 200-350 nm, which is then spray dried to obtain a spray-dried material;

step 4: calcination, which includes:
putting the spray-dried material into a roller furnace for calcining to obtain a calcined material; and step 5: adding pure water to the calcined material, then grinding the calcined material in water in a sand mill to obtain a slurry having a particle size of 150-250 nm, to which PEG, ferrous sulfate crystals and disodium EDTA are added and stirred to dissolve, adding a sodium borohydride solution and a sodium hydroxide solution while stirring and maintaining a pH in the process at 8.5-10.5, then reacting for 15-30 min to obtain a product, filtering the product, and washing and vacuum drying a residue obtained from the filtration to obtain the ferroboron alloy-coated lithium iron phosphate.

In the method for preparing the ferroboron alloy-coated lithium iron phosphate, in step 1, a molar ratio of ferrous sulfate, urea, phosphoric acid, ammonium dihydrogen phosphate, and hydrazine hydrate is 3:1.2-2.4:0.3-0.6:1.45-1.8:0.1-0.2.

In the method for preparing the ferroboron alloy-coated lithium iron phosphate, in step 1, the stirring is carried out at a speed of 200-400 r/min; and the heating is carried out at a heating rate of 40-60° C./h to reach a temperature of 85° C., and then at a reduced heating rate of 10-15° C./h.

In the method for preparing the ferroboron alloy-coated lithium iron phosphate, in step 2, a volume ratio of P204 extractant to sulfonated kerosene is 2-3:7-8; the lithium hydroxide solution has a concentration of 5-10 mol/L; a molar ratio of the lithium added to the P204 extractant is 0.7-0.8:1; the phosphoric acid solution has a concentration of 1.5-2.5 mol/L; during the stirring and mixing of the P204-lithium soap and the phosphoric acid solution, the stirring is carried out at a speed of 300-600 r/min, the P204-lithium soap and the phosphoric acid solution are added into a mixing tank while being stirred over a period of 60-120 min to form a water-in-oil droplet structure having an oil phase which is a continuous phase, the mixing tank having a disk turbine agitator as a stirring paddle, and after the addition is completed, keep stirring and reacting for 30-60 min; and the P204 extractant solution obtained from the centrifugation is recycled.

In the method for preparing the ferroboron alloy-coated lithium iron phosphate, in step 3, ferrous phosphate and lithium phosphate are mixed at a molar ratio of 1:1.01-1.05; the hydrazine hydrate solution has a concentration of 0.02-0.05 mol/L; a mass ratio of a total mass of the ferrous phosphate and the lithium phosphate to a mass of the hydrazine hydrate solution is 1:2.5-3.5; and in the spray drying process, the final spray-dried material has a particle size maintained at 3-8 μm, and a water mass content of less than 0.5%.

In the method for preparing the ferroboron alloy-coated lithium iron phosphate, in step 4, the calcination is carried out by heating up at a heating rate of 50-100° C./h to reach a temperature of 650-700° C., holding the temperature for 3-4 hours, and then cooling down at a cooling rate of 100-150° C./h until the material temperature is less than or equal to 80° C. before discharging the material.

In the method for preparing the ferroboron alloy-coated lithium iron phosphate, in step 5, the calcined material is pulverized to have a particle size ≤1 μm before entering the sand mill.

In the method for preparing the ferroboron alloy-coated lithium iron phosphate, in the process of adding pure water to the calcined material, a mass ratio of the calcined material to the pure water is 1:4-5; and a molar ratio of the calcined material, PEG, ferrous sulfate crystals, disodium EDTA and sodium borohydride is 1:0.05-0.1:0.012-0.018:0.01-0.02: 0.02-0.04.

In the method for preparing the ferroboron alloy-coated lithium iron phosphate, in step 5, the residue is vacuum dried at a temperature of 80-120° C. and a vacuum degree of −0.09~−0.08 MPa to have a water mass content of less than 500 ppm, and then vacuum packaged in a constant temperature and humidity dry room.

Beneficial Effect

The method according to the present disclosure eliminates or weakens space charge effect by introducing a stable conductive buffer layer (ferroboron alloy), suppresses the formation of interface layer and reduces interface resistance, and thus is suitable for preparing solid-state battery materials. Because the method does not use raw materials that generate gases to prepare lithium iron phosphate, the obtained product has a higher density, and the final product has a higher compacted density of 2.55 g/mL or more.

The method according to the present disclosure uses a metal alloy with better conductivity instead of conventional amorphous carbon for coating, that is, better conductivity and lower interface resistance may be achieved, and the product has excellent corrosion resistance and antioxidant capacity due to the alloy state of the coating, and has a high compacted density, so that the problem of rebounding upon compaction of amorphous carbon is overcome.

The alloy-coated lithium iron phosphate prepared according to the method of the present disclosure has a powder resistance of as low as about 0.2 Ω·cm, so the electronic conductivity is greatly improved.

DETAILED DESCRIPTION

Figure 1:
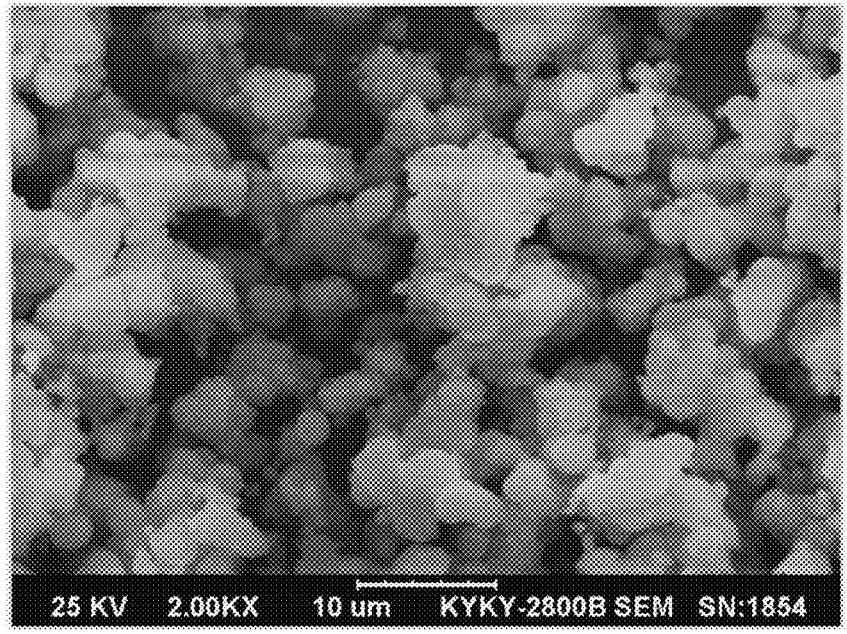
FIG. 1 is the SEM image of the ferrous phosphate prepared in Example 1 of the present disclosure.

The method for preparing the ferroboron alloy-coated lithium iron phosphate according to the present disclosure includes: preparing ferrous phosphate and lithium phosphate, respectively, then mixing the ferrous phosphate and the lithium phosphate as prepared and adding a hydrazine hydrate solution to obtain a mixture which is then subjected to grinding, drying and then calcining to obtain a calcined material, adding pure water to the calcined material and grinding the calcined material in water to obtain a slurry, to which PEG, ferrous sulfate crystals and disodium EDTA are added and stirred to dissolve, then adding a sodium borohydride solution and a sodium hydroxide solution while stirring and maintaining a pH in the process at 8.5-10.5, reacting for 15-30 min to obtain a product, and filtering, washing and vacuum drying the product to obtain the ferroboron alloy-coated lithium iron phosphate. The steps are specifically described as follows.

Step 1 of preparation of ferrous phosphate includes:
adding ferrous sulfate, urea, phosphoric acid, ammonium dihydrogen phosphate, and hydrazine hydrate together into a sealed reactor to obtain a solution, maintaining a pH of the solution at 1.5-2, and then introducing nitrogen to replace oxygen in the sealed reactor and make an oxygen content in the sealed reactor lower than 1000 ppm; heating up to reach a temperature of 100-110° C. while stirring the solution, reacting at the temperature for 30-60 min while stirring, then releasing pressure and cooling down so that a material temperature is lower than 50° C., discharging, filtering and washing the material to obtain a ferrous phosphate precipitate.

Step 2 of preparation of lithium phosphate includes:
adding P204 extractant to sulfonated kerosene and mixing them well to obtain an extractant solution, then preparing a lithium hydroxide solution and mixing the lithium hydroxide solution and the extractant solution to obtain a P204-lithium soap, to which a phosphoric acid solution is then added, and stirring and mixing the P204-lithium soap and the phosphoric acid solution to obtain a lithium phosphate precipitate and a P204 extractant solution, which are then subjected to centrifugation to obtain a lithium phosphate precipitate, and washing and drying the lithium phosphate precipitate to obtain lithium phosphate.

Step 3 includes mixing the ferrous phosphate and the lithium phosphate as prepared and adding a hydrazine hydrate solution to obtain a mixture, and grinding the mixture in a sand mill to obtain a slurry having a particle size of 200-350 nm, which is then spray dried to obtain a spray-dried material.

Step 4 of calcination includes:
putting the spray-dried material into a roller furnace for calcining to obtain a calcined material.

Step 5 includes adding pure water to the calcined material, then grinding the calcined material in water in a sand mill to obtain a slurry having a particle size of 150-250 nm, to which PEG, ferrous sulfate crystals and disodium EDTA are added and stirred to dissolve, adding a sodium borohydride solution and a sodium hydroxide solution while stirring and maintaining a pH in the process at 8.5-10.5, then reacting for 15-30 min to obtain a product, filtering the product, and washing and vacuum drying a residue obtained from the filtration to obtain the ferroboron alloy-coated lithium iron phosphate.

In the above step 1, a molar ratio of ferrous sulfate, urea, phosphoric acid, ammonium dihydrogen phosphate, and hydrazine hydrate is 3:1.2-2.4:0.3-0.6:1.45-1.8:0.1-0.2; the stirring is carried out at a speed of 200-400 r/min; and the heating is carried out at a heating rate of 40-60° C./h to reach a temperature of 85° C., and then at a reduced heating rate of 10-15° C./h.

In the above step 2, a volume ratio of P204 extractant to sulfonated kerosene is 2-3:7-8; the lithium hydroxide solution has a concentration of 5-10 mol/L; a molar ratio of the lithium added to the P204 extractant is 0.7-0.8:1; the phosphoric acid solution has a concentration of 1.5-2.5 mol/L; during the stirring and mixing of the P204-lithium soap and the phosphoric acid solution, the stirring is carried out at a speed of 300-600 r/min, the P204-lithium soap and the phosphoric acid solution are added into a mixing tank while being stirred over a period of 60-120 min to form a water-in-oil droplet structure having an oil phase which is a continuous phase, the mixing tank having a disk turbine agitator as a stirring paddle, and after the addition is completed, keep stirring and reacting for 30-60 min; and the P204 extractant solution obtained from the centrifugation is recycled.

In the above step 3, ferrous phosphate and lithium phosphate are mixed at a molar ratio of 1:1.01-1.05; the hydrazine hydrate solution has a concentration of 0.02-0.05 mol/L; a mass ratio of a total mass of the ferrous phosphate and the lithium phosphate to a mass of the hydrazine hydrate solution is 1:2.5-3.5; the sand mill uses zirconia ceramic balls as a grinding medium; and in the spray drying process, the final spray-dried material has a particle size maintained at 3-8 μm, and a water mass content of less than 0.5%.

In the above step 4, the calcination is carried out by heating up at a heating rate of 50-100° C./h to reach a temperature of 650-700° C., holding the temperature for 3-4 hours, and then cooling down at a cooling rate of 100-150° C./h until the material temperature is less than or equal to 80° C. before discharging the material.

In the above step 5, the calcined material is pulverized to have a particle size ≤1 μm before entering the sand mill; in the process of adding pure water to the calcined material, a mass ratio of the calcined material to the pure water is 1:4-5; and a molar ratio of the calcined material, PEG, ferrous sulfate crystals, disodium EDTA and sodium borohydride is 1:0.05-0.1:0.012-0.018:0.01-0.02:0.02-0.04; and in the process of vacuum drying, the residue is vacuum dried at a temperature of 80-120° C. and a vacuum degree of –0.09~–0.08 MPa to have a water mass content of less than 500 ppm, and then vacuum packaged in a constant temperature and humidity dry room.

The method according to the present disclosure uses a metal alloy with better conductivity instead of conventional amorphous carbon for coating, that is, better conductivity and lower interface resistance may be achieved, and the product prepared according to the present disclosure has excellent corrosion resistance and antioxidant capacity due to the alloy state of the coating, and has a high compacted density, so that the problem of amorphous carbon which has very low compacted density and will rebound when compacted due to the presence of a large number of loose porous structures, is overcome.

Conventional carbon-coated lithium iron phosphate has a powder resistance of 10-50 Ω·cm (at a pressure of 10 MPa), while the alloy-coated lithium iron phosphate prepared according to the method of the present disclosure has a powder resistance of as low as about 0.2 Ω·cm, so the electronic conductivity is greatly improved.

The corrosion resistance is measured by simultaneously putting each of the material of the present disclosure and carbon-coated lithium iron phosphate into a 0.1 mol/L hydrochloric acid solution at a temperature of 25° C. and left for 60 min, and then measuring the concentration of iron element in the hydrochloric acid solution, and after the treatment, the product according to the present disclosure has a concentration of iron element in the solution comparable to that of the carbon-coated lithium iron phosphate.

The method of the present disclosure is further described below in conjunction with specific examples.

Example 1

Ferrous sulfate, urea, phosphoric acid, ammonium dihydrogen phosphate, and hydrazine hydrate were put into a sealed reactor at a molar ratio of 3:2:0.4:1.6:0.15 to obtain a solution which was maintained at a pH of 1.8, and nitrogen was introduced so that the oxygen content in the sealed reactor was 821 ppm, heating was performed to reach a temperature of 105° C. while stirring, and reaction was carried out for 50 min while stirring, then the pressure was released, the material was cooled to a temperature of 49° C. and then discharged, filtered and washed to obtain a ferrous phosphate precipitation. The stirring speed was 300 r/min, and the heating was carried out at a heating rate of 50° C./h to reach a temperature of 85° C. first, and then at a reduced heating rate of 10° C./h.

P204 extractant was added to and mixed uniformly with sulfonated kerosene at a volume ratio of 3:7 (P204 extractant to sulfonated kerosene) to obtain an extractant solution; a lithium hydroxide solution having a concentration of 8 mol/L was prepared; the extractant solution and the lithium hydroxide solution were mixed at a molar ratio of 1:0.75 to obtain a P204-lithium soap, to which a phosphoric acid solution having a concentration of 2 mol/L was then added, and the P204-lithium soap and the phosphoric acid solution were added while being stirred at a stirring speed of 500 r/min into a mixing tank, which had a disk turbine agitator as a stirring paddle, over a period of 80 min, to form a water-in-oil droplet structure having an oil phase which was a continuous phase. After the addition was completed, reaction was carried out while stirring for 50 min to obtain a lithium phosphate precipitate and a P204 extractant solution which were subjected to centrifugation to obtain a lithium phosphate precipitate, and the lithium phosphate precipitate was washed and dried to obtain lithium phosphate; and the P204 extractant solution obtained from the centrifugation was recycled.

The ferrous phosphate and the lithium phosphate were mixed at a molar ratio of 1:1.03, and a hydrazine hydrate solution with a concentration of 0.04 mol/L was added to obtain a mixture, a mass ratio of a total mass of the ferrous phosphate and the lithium phosphate to a mass of the hydrazine hydrate solution was 1:3; then the mixture was added to a sand mill for grinding using zirconia ceramic balls as the grinding medium to have a particle size of 285 nm to obtain a slurry, and then the slurry was spray dried to obtain a spray-dried material having a particle size of 6.5 μm, and a water mass content of 0.41%.

The spray-dried material was put into a roller furnace for calcination to obtain a calcined material. The calcination was carried out by heating up at a heating rate of 80° C./h to reach a temperature of 680° C., holding the temperature for 3.5 hours, and then cooling down at a cooling rate of 125° C./h to reach a material temperature of 80° C. before discharging the material.

The calcined material was pulverized to have a particle size ≤1 μm, pure water was added at a mass ratio of 1:4.5 (calcined material to pure water), and the calcined material in water was ground to have a particle size of 190 nm to obtain a slurry, to which PEG, ferrous sulfate crystals and disodium EDTA were then added and stirred to dissolve, where a molar ratio of the calcined material, PEG, ferrous sulfate crystals, disodium EDTA and sodium borohydride was 1:0.08:0.016:0.02:0.03, and subsequently, a sodium borohydride solution and a sodium hydroxide solution were added while stirring, a pH in the process was maintained at 9.2, and then reaction was carried out for 30 min to obtain a product, which was then filtered, and the residue obtained from the filtration was washed and vacuum dried at a temperature of 110° C. and a vacuum degree of –0.085 MPa to have a water mass content of 450 ppm, and vacuum packaged in a constant temperature and humidity dry room to obtain the ferroboron alloy-coated lithium iron phosphate.

The SEM image of the final ferrous phosphate is shown in FIG. 1. As shown in FIG. 1, the product has a loose and porous granular structure with a D50 of 6.2 μm. The test results of the final product are shown in Table 1:

TABLE 1

Properties of ferrous phosphate product

| Index | Fe | P | BET | D50 |
|---|---|---|---|---|
| Data | 33.27% | 12.31% | 15.4 m$^2$/g | 6.2 μm |
| | Ca | Mg | Na | Ni | Cr |
| | 17.2 ppm | 21.4 ppm | 39.4 ppm | 1.4 ppm | 1.1 ppm |

Figure 2:
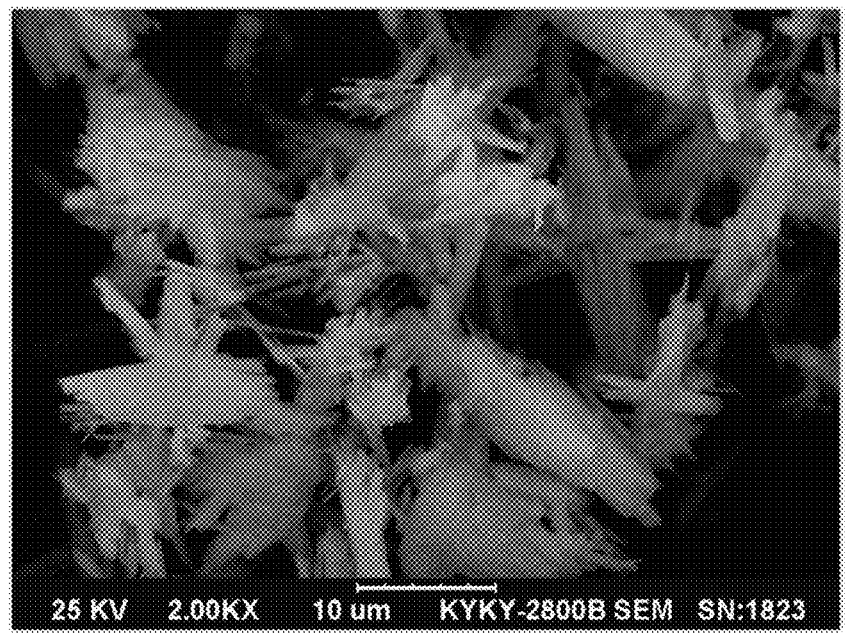
FIG. 2 is the SEM image of the lithium phosphate prepared in Example 1 of the present disclosure.

The SEM image of the final lithium phosphate is shown in FIG. 2. As shown in the SEM image, the product has a bar-shape structure. The present disclosure uses interface reaction to prepare lithium phosphate, and the obtained lithium phosphate has a relatively large BET of 12.7 m$^2$/g.

The test results of the final lithium iron phosphate are shown in Table 2:

TABLE 2

Properties of lithium iron phosphate product

| Index | Fe | Li | P | B |
|---|---|---|---|---|
| Data | 35.57% | 4.41% | 19.59% | 0.11% |
| Powder resistance | Compacted density | Iron dissolution | Free lithium | pH |
| 0.12 Ω·cm | 2.58 g/mL | 6.7 ppm | 18 ppm | 8.2 |
| First charge capacity at 0.1 C | First discharge capacity at 0.1 C | First discharge efficiency | Mean voltage | Tap density |
| 168 mAh/g | 163 mAh/g | 97.0% | 3.14 V | 1.53 g/mL |
| Capacity retention at −20° C. | Cycle performance at 1 C at ambient temperature | BET | Discharge capacity at 1 C | Discharge capacity at 3 C |
| 92.3% | ≥3500 cycles | 6.75 m$^2$/g | 158 mAh/g | 149 mAh/g |

The powder resistance was measured by four-probe method at a pressure of 10 MPa.

The compacted density was measured at a pressure of 3 T.

The iron dissolution was measured by adding 10 g of the material into 100 mL of a 0.01 mol/L hydrochloric acid solution and soaking it for 60 min at a temperature of 25° C., then filtering the material and measuring the iron in the filtrate.

The free lithium was detected by adding 10 g of the material to 100 ml of pure water and stirring for 30 min, then filtering the material and measuring the lithium in the filtrate.

Figure 3:
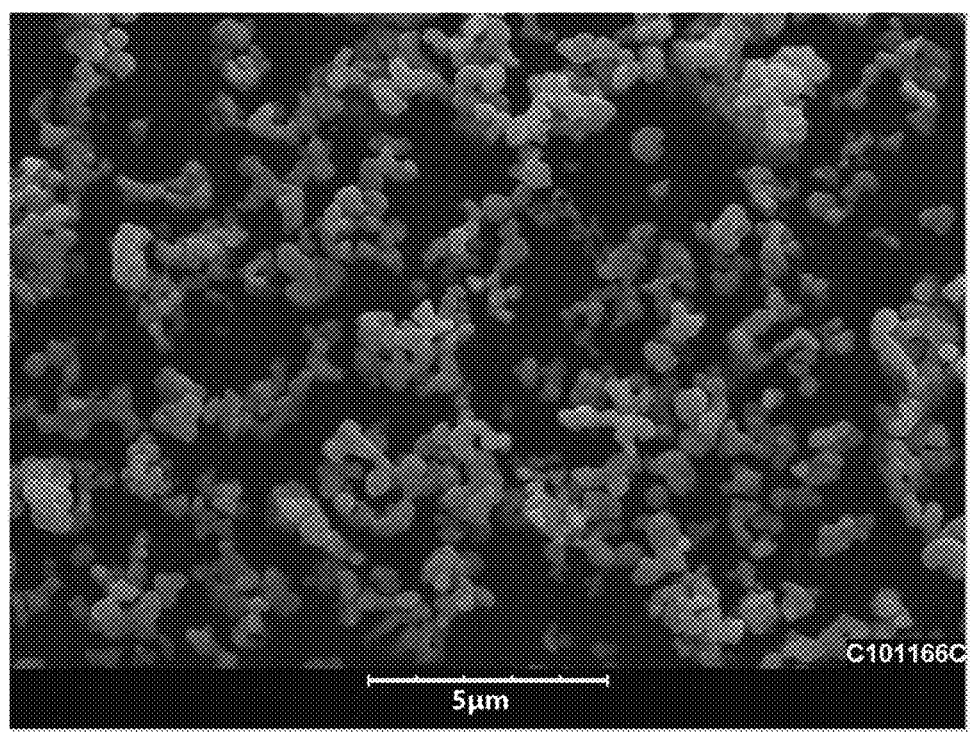
FIG. 3 is the SEM image of the ferroboron alloy-coated lithium iron phosphate prepared in Example 1 of the present disclosure.

As shown in the data, the product prepared in Example 1 has a low powder resistance of 0.12 Ω·cm which is less than that of conventional carbon-coated lithium iron phosphate by 2 orders of magnitude or more, a high capacity retention rate at −20° C., and excellent rate performance, and its SEM image is shown in FIG. 3.

Example 2

Ferrous sulfate, urea, phosphoric acid, ammonium dihydrogen phosphate, and hydrazine hydrate were put into a sealed reactor at a molar ratio of 3:1.8:0.5:1.5:0.1 to obtain a solution which was maintained at a pH of 1.9, and nitrogen was introduced so that the oxygen content in the sealed reactor was 906 ppm, heating was performed to reach a temperature of 100° C. while stirring, and reaction was carried out for 45 min while stirring, then the pressure was released, the material was cooled to a temperature of 48° C. and then discharged, filtered and washed to obtain a ferrous phosphate precipitation. The stirring speed was 400 r/min, and the heating was carried out at a heating rate of 55° C./h to reach a temperature of 85° C. first, and then at a reduced heating rate of 15° C./h.

P204 extractant was added to and mixed uniformly with sulfonated kerosene at a volume ratio of 2:7.5 (P204 extractant to sulfonated kerosene) to obtain an extractant solution; a lithium hydroxide solution having a concentration of 7 mol/L was prepared; the extractant solution and the lithium hydroxide solution were mixed at a molar ratio of 1:0.7 to obtain a P204-lithium soap, to which a phosphoric acid solution having a concentration of 2.3 mol/L was then added, and the P204-lithium soap and the phosphoric acid solution were added while being stirred at a stirring speed of 480 r/min into a mixing tank, which had a disk turbine agitator as a stirring paddle, over a period of 100 min, to form a water-in-oil droplet structure having an oil phase which was a continuous phase. After the addition was completed, reaction was carried out while stirring for 60 min to obtain a lithium phosphate precipitate and a P204 extractant solution which were subjected to centrifugation to obtain a lithium phosphate precipitate, and the lithium phosphate precipitate was washed and dried to obtain lithium phosphate; and the P204 extractant solution obtained from the centrifugation was recycled.

The ferrous phosphate and the lithium phosphate were mixed at a molar ratio of 1:1.02, and a hydrazine hydrate solution with a concentration of 0.03 mol/L was added to obtain a mixture, a mass ratio of a total mass of the ferrous phosphate and the lithium phosphate to a mass of the hydrazine hydrate solution was 1:2.5; then the mixture was added to a sand mill for grinding using zirconia ceramic balls as the grinding medium to have a particle size of 230 nm to obtain a slurry, and then the slurry was spray dried to obtain a spray-dried material having a particle size of 9 μm, and a water mass content of 0.5%.

The spray-dried material was put into a roller furnace for calcination to obtain a calcined material. The calcination was carried out by heating up at a heating rate of 50° C./h to reach a temperature of 650° C., holding the temperature for 3 hours, and then cooling down at a cooling rate of 150° C./h to reach a material temperature of 79° C. before discharging the material.

Pure water was added at a mass ratio of 1:5 (calcined material to pure water) to the calcined material, and the calcined material in water was ground to have a particle size of 150 nm to obtain a slurry, to which PEG, ferrous sulfate crystals and disodium EDTA were then added and stirred to dissolve, where a molar ratio of the calcined material, PEG, ferrous sulfate crystals, disodium EDTA and sodium borohydride was 1:0.1:0.015:0.01:0.02, and subsequently a sodium borohydride solution and a sodium hydroxide solution were added while stirring, a pH in the process was maintained at 10, and then reaction was carried out for 25 min to obtain a product, which was then filtered, and the residue obtained from the filtration was washed and vacuum dried at a temperature of 100° C. and a vacuum degree of −0.09 MPa to have a water mass content of 420 ppm, and vacuum packaged in a constant temperature and humidity dry room to obtain the ferroboron alloy-coated lithium iron phosphate.

The properties of the final lithium iron phosphate are shown in Table 3:

TABLE 3

Properties of lithium iron phosphate product

| Index | Fe | Li | P | B |
|---|---|---|---|---|
| Data | 35.51% | 4.46% | 19.98% | 0.07% |
| Powder resistance | Compacted density | Iron dissolution | Free lithium | pH |
| 0.11 Ω·cm | 2.61 g/mL | 6.1 ppm | 25 ppm | 8.4 |
| First charge capacity at 0.1 C | First discharge capacity at 0.1 C | First discharge efficiency | Mean voltage | Tap density |
| 168 mAh/g | 162 mAh/g | 96.4% | 3.16 V | 1.58 g/mL |
| Capacity retention at −20° C. | Cycle performance at 1 C at ambient temperature | BET | Discharge capacity at 1 C | Discharge capacity at 3 C |
| 92.9% | ≥3500 cycles | 6.46 m²/g | 156 mAh/g | 147 mAh/g |

The product prepared in Example 2 has a low powder resistance of 0.11 Ω·cm which is less than that of conventional carbon-coated lithium iron phosphate by 2 orders of magnitude or more, a high capacity retention rate at −20° C., and excellent rate performance.

Example 3

Ferrous sulfate, urea, phosphoric acid, ammonium dihydrogen phosphate, and hydrazine hydrate were put into a sealed reactor at a molar ratio of 3:1.9:0.6:1.7:0.2 to obtain a solution which was maintained at a pH of 2, and nitrogen was introduced so that the oxygen content in the sealed reactor was 830 ppm, heating was performed to reach a temperature of 103° C. while stirring, and reaction was carried out for 30 min while stirring, then the pressure was released, the material was cooled to a temperature of 49° C. and then discharged, filtered and washed to obtain a ferrous phosphate precipitation. The stirring speed was 350 r/min, and the heating was carried out at a heating rate of 40° C./h to reach a temperature of 85° C. first, and then at a reduced heating rate of 11° C./h.

P204 extractant was added to and mixed uniformly with sulfonated kerosene at a volume ratio of 2.5:7.8 (P204 extractant to sulfonated kerosene) to obtain an extractant solution; a lithium hydroxide solution having a concentration of 9 mol/L was prepared; the extractant solution and the lithium hydroxide solution were mixed at a molar ratio of 1:0.8 to obtain a P204-lithium soap, to which a phosphoric acid solution having a concentration of 1.9 mol/L was then added, and the P204-lithium soap and the phosphoric acid solution were added while being stirred at a stirring speed of 530 r/min into a mixing tank, which had a disk turbine agitator as a stirring paddle, over a period of 60 min, to form a water-in-oil droplet structure having an oil phase which was a continuous phase. After the addition was completed, reaction was carried out while stirring for 30 min to obtain a lithium phosphate precipitate and a P204 extractant solution which were subjected to centrifugation to obtain a lithium phosphate precipitate, and the lithium phosphate precipitate was washed and dried to obtain lithium phosphate; and the P204 extractant solution obtained from the centrifugation was recycled.

The ferrous phosphate and the lithium phosphate were mixed at a molar ratio of 1:1.02, and a hydrazine hydrate solution with a concentration of 0.02 mol/L was added to obtain a mixture, a mass ratio of a total mass of the ferrous phosphate and the lithium phosphate to a mass of the hydrazine hydrate solution was 1:2.8; then the mixture was added to a sand mill for grinding using zirconia ceramic balls as the grinding medium to have a particle size of 300 nm to obtain a slurry, and then the slurry was spray dried to obtain a spray-dried material having a particle size of 6 μm, and a water mass content of 0.45%.

The spray-dried material was put into a roller furnace for calcination to obtain a calcined material. The calcination was carried out by heating up at a heating rate of 75° C./h to reach a temperature of 670° C., holding the temperature for 3.6 hours, and then cooling down at a cooling rate of 130° C./h to reach a material temperature of 80° C. before discharging the material.

The calcined material was pulverized to have a particle size ≤1 μm, pure water was added at a mass ratio of 1:4 (calcined material to pure water), and the calcined material in water was ground to have a particle size of 250 nm to obtain a slurry, to which PEG, ferrous sulfate crystals and disodium EDTA were then added and stirred to dissolve, where a molar ratio of the calcined material, PEG, ferrous sulfate crystals, disodium EDTA and sodium borohydride was 1:0.09:0.017:0.01:0.04, and subsequently a sodium borohydride solution and a sodium hydroxide solution were added while stirring, a pH in the process was maintained at 9, and then reaction was carried out for 15 min to obtain a product, which was then filtered, and the residue obtained from the filtration was washed and vacuum dried at a temperature of 90° C. and a vacuum degree of −0.08 MPa to have a water mass content of 499 ppm, and vacuum packaged in a constant temperature and humidity dry room to obtain the ferroboron alloy-coated lithium iron phosphate.

The properties of the final lithium iron phosphate are shown in Table 4:

TABLE 4

Properties of lithium iron phosphate product

| Index | Fe | Li | P | B |
|---|---|---|---|---|
| Data | 35.97% | 4.45% | 19.96% | 0.15% |
| Powder resistance | Compacted density | Iron dissolution | Free lithium | pH |
| 0.08 Ω·cm | 2.56 g/mL | 8.1 ppm | 23 ppm | 8.3 |
| First charge capacity at 0.1 C | First discharge capacity at 0.1 C | First discharge efficiency | Mean voltage | Tap density |
| 169 mAh/g | 164 mAh/g | 97.0% | 3.17 V | 1.59 g/mL |
| Capacity retention at −20° C. | Cycle performance at 1 C at ambient temperature | BET | Discharge capacity at 1 C | Discharge capacity at 3 C |
| 93.6% | ≥3500 cycles | 6.49 m²/g | 159 mAh/g | 149 mAh/g |

The product prepared in Example 3 has a low powder resistance of 0.08 Ω·cm which is less than that of conventional carbon-coated lithium iron phosphate by 2 orders of magnitude or more, a high capacity retention rate at −20° C., and excellent rate performance Example 4

Ferrous sulfate, urea, phosphoric acid, ammonium dihydrogen phosphate, and hydrazine hydrate were put into a sealed reactor at a molar ratio of 3:2.1:0.3:1.45:0.18 to obtain a solution which was maintained at a pH of 1.7, and nitrogen was introduced so that the oxygen content in the sealed reactor was 980 ppm, heating was performed to reach a temperature of 110° C. while stirring, and reaction was carried out for 35 min while stirring, then the pressure was released, the material was cooled to a temperature of 49° C. and then discharged, filtered and washed to obtain a ferrous phosphate precipitation. The stirring speed was 250 r/min, and the heating was carried out at a heating rate of 60° C./h to reach a temperature of 85° C. first, and then at a reduced heating rate of 13° C./h.

P204 extractant was added to and mixed uniformly with sulfonated kerosene at a volume ratio of 2.8:7.2 (P204 extractant to sulfonated kerosene) to obtain an extractant solution; a lithium hydroxide solution having a concentration of 5 mol/L was prepared; the extractant solution and the lithium hydroxide solution were mixed at a molar ratio of 1:0.77 to obtain a P204-lithium soap, to which a phosphoric acid solution having a concentration of 2.5 mol/L was then added, and the P204-lithium soap and the phosphoric acid solution were added while being stirred at a stirring speed of 600 r/min into a mixing tank, which had a disk turbine agitator as a stirring paddle, over a period of 120 min, to form a water-in-oil droplet structure having an oil phase which was a continuous phase. After the addition was completed, reaction was carried out while stirring for 40 min to obtain a lithium phosphate precipitate and a P204 extractant solution which were subjected to centrifugation to obtain a lithium phosphate precipitate, and the lithium phosphate precipitate was washed and dried to obtain lithium phosphate; and the P204 extractant solution obtained from the centrifugation was recycled.

The ferrous phosphate and the lithium phosphate were mixed at a molar ratio of 1:1.04, and a hydrazine hydrate solution with a concentration of 0.05 mol/L was added to obtain a mixture, a mass ratio of a total mass of the ferrous phosphate and the lithium phosphate to a mass of the hydrazine hydrate solution was 1:3; then the mixture was added to a sand mill for grinding using zirconia ceramic balls as the grinding medium to have a particle size of 200 nm to obtain a slurry, and then the slurry was spray dried to obtain a spray-dried material having a particle size of 5 μm, and a water mass content of 0.39%.

The spray-dried material was put into a roller furnace for calcination to obtain a calcined material. The calcination was carried out by heating up at a heating rate of 100° C./h to reach a temperature of 700° C., holding the temperature for 4 hours, and then cooling down at a cooling rate of 100° C./h to reach a material temperature of 78° C. before discharging the material.

The calcined material was pulverized to have a particle size of 0.95 μm, pure water was added at a mass ratio of 1:4.5 (calcined material to pure water), and the calcined material in water was ground to have a particle size of 150 nm to obtain a slurry, to which PEG, ferrous sulfate crystals and disodium EDTA were then added and stirred to dissolve, where a molar ratio of the calcined material, PEG, ferrous sulfate crystals, disodium EDTA and sodium borohydride was 1:0.07:0.013:0.02:0.03, and subsequently a sodium borohydride solution and a sodium hydroxide solution were added while stirring, a pH in the process was maintained at 8.5, and then reaction was carried out for 20 min to obtain a product, which was then filtered, and the residue obtained from the filtration was washed and vacuum dried at a temperature of 80° C. and a vacuum degree of −0.088 MPa to have a water mass content of 490 ppm, and vacuum packaged in a constant temperature and humidity dry room to obtain the ferroboron alloy-coated lithium iron phosphate.

The properties of the final lithium iron phosphate are shown in Table 5:

TABLE 5

| Properties of lithium iron phosphate product | | | | |
|---|---|---|---|---|
| Index | Fe | Li | P | B |
| Data | 36.02% | 4.48% | 19.89% | 0.11% |
| Powder resistance | Compacted density | Iron dissolution | Free lithium | pH |
| 0.09 Ω·cm | 2.59 g/mL | 8.6 ppm | 31 ppm | 8.6 |
| First charge capacity at 0.1 C | First discharge capacity at 0.1 C | First discharge efficiency | Mean voltage | Tap density |
| 168 mAh/g | 164 mAh/g | 97.6% | 3.15 V | 1.56 g/mL |
| Capacity retention at −20° C. | Cycle performance at 1 C at ambient temperature | BET | Discharge capacity at 1 C | Discharge capacity at 3 C |
| 92.7% | ≥3500 cycles | 6.98 m²/g | 156 mAh/g | 147 mAh/g |

The product prepared in Example 4 has a low powder resistance of 0.09 Ω·cm which is less than that of conventional carbon-coated lithium iron phosphate by 2 orders of magnitude or more, a high capacity retention rate at −20° C., and excellent rate performance.

Example 5

Ferrous sulfate, urea, phosphoric acid, ammonium dihydrogen phosphate, and hydrazine hydrate were put into a sealed reactor at a molar ratio of 3:2.4:0.4:1.8:0.12 to obtain a solution which was maintained at a pH of 1.6, and nitrogen was introduced so that the oxygen content in the sealed reactor was 850 ppm, heating was performed to reach a temperature of 107° C. while stirring, and reaction was carried out for 60 min while stirring, then the pressure was released, the material was cooled to a temperature of 50° C. and then discharged, filtered and washed to obtain a ferrous phosphate precipitation. The stirring speed was 320 r/min, and the heating was carried out at a heating rate of 45° C./h to reach a temperature of 85° C. first, and then at a reduced heating rate of 12° C./h.

P204 extractant was added to and mixed uniformly with sulfonated kerosene at a volume ratio of 2.2:7.9 (P204 extractant to sulfonated kerosene) to obtain an extractant solution; a lithium hydroxide solution having a concentration of 10 mol/L was prepared; the extractant solution and the lithium hydroxide solution were mixed at a molar ratio of 1:0.73 to obtain a P204-lithium soap, to which a phosphoric acid solution having a concentration of 1.5 mol/L was then added, and the P204-lithium soap and the phosphoric acid solution were added while being stirred at a stirring speed of 450 r/min into a mixing tank, which had a disk turbine agitator as a stirring paddle, over a period of 110 min, to form a water-in-oil droplet structure having an oil phase which was a continuous phase. After the addition was completed, reaction was carried out while stirring for 35 min to obtain a lithium phosphate precipitate and a P204 extractant solution which were subjected to centrifugation to obtain a lithium phosphate precipitate, and the lithium phosphate precipitate was washed and dried to obtain lithium phosphate; and the P204 extractant solution obtained from the centrifugation was recycled.

The ferrous phosphate and the lithium phosphate were mixed at a molar ratio of 1:1.03, and a hydrazine hydrate solution with a concentration of 0.03 mol/L was added to obtain a mixture, a mass ratio of a total mass of the ferrous phosphate and the lithium phosphate to a mass of the hydrazine hydrate solution was 1:3.2; then the mixture was added to a sand mill for grinding using zirconia ceramic balls as the grinding medium to have a particle size of 300 nm to obtain a slurry, and then the slurry was spray dried to obtain a spray-dried material having a particle size of 4 μm, and a water mass content of 0.48%.

The spray-dried material was put into a roller furnace for calcination to obtain a calcined material. The calcination was carried out by heating up at a heating rate of 60° C./h to reach a temperature of 690° C., holding the temperature for 3.2 hours, and then cooling down at a cooling rate of 120° C./h to reach a material temperature of 79° C. before discharging the material.

Pure water was added at a mass ratio of 1:4.8 (calcined material to pure water) to the calcined material, and the calcined material in water was ground to have a particle size of 200 nm to obtain a slurry, to which PEG, ferrous sulfate crystals and disodium EDTA were then added and stirred to dissolve, where a molar ratio of the calcined material, PEG, ferrous sulfate crystals, disodium EDTA and sodium borohydride was 1:0.06:0.014:0.01:0.04, and subsequently a sodium borohydride solution and a sodium hydroxide solution were added while stirring, a pH in the process was maintained at 10.5, and then reaction was carried out for 28 min to obtain a product, which was then filtered, and the residue obtained from the filtration was washed and vacuum dried at a temperature of 120° C. and a vacuum degree of −0.082 MPa to have a water mass content of 480 ppm, and vacuum packaged in a constant temperature and humidity dry room to obtain the ferroboron alloy-coated lithium iron phosphate.

The properties of the final lithium iron phosphate are shown in Table 6:

TABLE 6

Properties of lithium iron phosphate product

| Index | Fe | Li | P | B |
|---|---|---|---|---|
| Data | 35.78% | 4.41% | 19.84% | 0.11% |
| Powder resistance | Compacted density | Iron dissolution | Free lithium | pH |
| 0.10 Ω · cm | 2.58 g/mL | 9.5 ppm | 19 ppm | 8.5 |
| First charge capacity at 0.1 C | First discharge capacity at 0.1 C | First discharge efficiency | Mean voltage | Tap density |
| 169 mAh/g | 163 mAh/g | 96.4% | 3.16 V | 1.53 g/mL |
| Capacity retention at −20° C. | Cycle performance at 1 C at ambient temperature | BET | Discharge capacity at 1 C | Discharge capacity at 3 C |
| 92.5% | ≥3500 cycles | 6.57 m²/g | 158 mAh/g | 148 mAh/g |

The product prepared in Example 5 has a low powder resistance of 0.10 Ω·cm which is less than that of conventional carbon-coated lithium iron phosphate by 2 orders of magnitude or more, a high capacity retention rate at −20° C., and excellent rate performance.

Example 6

Ferrous sulfate, urea, phosphoric acid, ammonium dihydrogen phosphate, and hydrazine hydrate were put into a sealed reactor at a molar ratio of 3:1.5:0.5:1.65:0.15 to obtain a solution which was maintained at a pH of 1.5, and nitrogen was introduced so that the oxygen content in the sealed reactor was 890 ppm, heating was performed to reach a temperature of 109° C. while stirring, and reaction was carried out for 55 min while stirring, then the pressure was released, the material was cooled to a temperature of 50° C. and then discharged, filtered and washed to obtain a ferrous phosphate precipitation. The stirring speed was 200 r/min, and the heating was carried out at a heating rate of 53° C./h to reach a temperature of 85° C. first, and then at a reduced heating rate of 14° C./h.

P204 extractant was added to and mixed uniformly with sulfonated kerosene at a volume ratio of 2:7 (P204 extractant to sulfonated kerosene) to obtain an extractant solution; a lithium hydroxide solution having a concentration of 6 mol/L was prepared; the extractant solution and the lithium hydroxide solution were mixed at a molar ratio of 1:0.78 to obtain a P204-lithium soap, to which a phosphoric acid solution having a concentration of 1.8 mol/L was then added, and the P204-lithium soap and the phosphoric acid solution were added while being stirred at a stirring speed of 300 r/min into a mixing tank, which had a disk turbine agitator as a stirring paddle, over a period of 70 min, to form a water-in-oil droplet structure having an oil phase which was a continuous phase. After the addition was completed, reaction was carried out while stirring for 55 min to obtain a lithium phosphate precipitate and a P204 extractant solution which were subjected to centrifugation to obtain a lithium phosphate precipitate, and the lithium phosphate precipitate was washed and dried to obtain lithium phosphate; and the P204 extractant solution obtained from the centrifugation was recycled.

The ferrous phosphate and the lithium phosphate were mixed at a molar ratio of 1:1.05, and a hydrazine hydrate solution with a concentration of 0.05 mol/L was added to obtain a mixture, a mass ratio of a total mass of the ferrous phosphate and the lithium phosphate to a mass of the hydrazine hydrate solution was 1:3.5; then the mixture was added to a sand mill for grinding using zirconia ceramic balls as the grinding medium to have a particle size of 250 nm to obtain a slurry, and then the slurry was spray dried to obtain a spray-dried material having a particle size of 3 μm, and a water mass content of 0.43%.

The spray-dried material was put into a roller furnace for calcination to obtain a calcined material. The calcination was carried out by heating up at a heating rate of 70° C./h to reach a temperature of 660° C., holding the temperature for 3.8 hours, and then cooling down at a cooling rate of 140° C./h to reach a material temperature of 77° C. before discharging the material.

Pure water was added at a mass ratio of 1:4.2 (calcined material to pure water) to the calcined material, and the calcined material in water was ground to have a particle size of 180 nm to obtain a slurry, to which PEG, ferrous sulfate crystals and disodium EDTA were added and stirred to dissolve, where a molar ratio of the calcined material, PEG, ferrous sulfate crystals, disodium EDTA and sodium borohydride was 1:0.05:0.018:0.02:0.02, and subsequently a sodium borohydride solution and a sodium hydroxide solution were added while stirring, a pH in the process was maintained at 9.2, and then reaction was carried out for 30 min to obtain a product, which was then filtered, and the residue obtained from the filtration was washed and vacuum dried at a temperature of 105° C. and a vacuum degree of −0.08 MPa to have a water mass content of 470 ppm, and vacuum packaged in a constant temperature and humidity dry room to obtain the ferroboron alloy-coated lithium iron phosphate.

The properties of the final lithium iron phosphate are shown in Table 7:

TABLE 7

Properties of lithium iron phosphate product

| Index | Fe | Li | P | B |
|---|---|---|---|---|
| Data | 35.57% | 4.56% | 20.35% | 0.05% |
| Powder resistance | Compacted density | Iron dissolution | Free lithium | pH |
| 0.21 Ω·cm | 2.67 g/mL | 3.7 ppm | 54 ppm | 8.3 |
| First charge capacity at 0.1 C | First discharge capacity at 0.1 C | First discharge efficiency | Mean voltage | Tap density |
| 168 mAh/g | 162 mAh/g | 96.4% | 3.11 V | 1.62 g/mL |
| Capacity retention at −20° C. | Cycle performance at 1 C at ambient temperature | BET | Discharge capacity at 1 C | Discharge capacity at 3 C |
| 91.3% | ≥3500 cycles | 6.17 m²/g | 156 mAh/g | 145 mAh/g |

The product prepared in Example 6 has a low powder resistance of 0.21 Ω·cm which is less than that of conventional carbon-coated lithium iron phosphate by 2 orders of magnitude or more, a high capacity retention rate at −20° C., and excellent rate performance.

Example 7

Ferrous sulfate, urea, phosphoric acid, ammonium dihydrogen phosphate, and hydrazine hydrate were put into a sealed reactor at a molar ratio of 3:1.2:0.6:1.55:0.17 to obtain a solution which was maintained at a pH of 1.8, and nitrogen was introduced so that the oxygen content in the sealed reactor was 932 ppm, heating was performed to reach a temperature of 106° C. while stirring, and reaction was carried out for 40 min while stirring, then the pressure was released, the material was cooled to a temperature of 50° C. and then discharged, filtered and washed to obtain a ferrous phosphate precipitation. The stirring speed was 250 r/min, and the heating was carried out at a heating rate of 50° C./h to reach a temperature of 85° C. first, and then at a reduced heating rate of 10° C./h.

P204 extractant was added to and mixed uniformly with sulfonated kerosene at a volume ratio of 3:8 (P204 extractant to sulfonated kerosene) to obtain an extractant solution; a lithium hydroxide solution having a concentration of 8 mol/L was prepared; the extractant solution and the lithium hydroxide solution were mixed at a molar ratio of 1:0.74 to obtain a P204-lithium soap, to which a phosphoric acid solution having a concentration of 1.5 mol/L was then added, and the P204-lithium soap and the phosphoric acid solution were added while being stirred at a stirring speed of 360 r/min into a mixing tank, which had a disk turbine agitator as a stirring paddle, over a period of 90 min, to form a water-in-oil droplet structure having an oil phase which was a continuous phase. After the addition was completed, reaction was carried out while stirring for 45 min to obtain a lithium phosphate precipitate and a P204 extractant solution which were subjected to centrifugation to obtain a lithium phosphate precipitate, and the lithium phosphate precipitate was washed and dried to obtain lithium phosphate; and the P204 extractant solution obtained from the centrifugation was recycled.

The ferrous phosphate and the lithium phosphate were mixed at a molar ratio of 1:1.01, and a hydrazine hydrate solution with a concentration of 0.03 mol/L was added to obtain a mixture, a mass ratio of a total mass of the ferrous phosphate and the lithium phosphate to a mass of the hydrazine hydrate solution was 1:3.3; then the mixture was added to a sand mill for grinding using zirconia ceramic balls as the grinding medium to have a particle size of 325 nm to obtain a slurry, and then the slurry was spray dried to obtain a spray-dried material having a particle size of 8 μm, and a water mass content of 0.40%.

The spray-dried material was put into a roller furnace for calcination to obtain a calcined material. The calcination was carried out by heating up at a heating rate of 90° C./h to reach a temperature of 680° C., holding the temperature for 3.5 hours, and then cooling down at a cooling rate of 110° C./h to reach a material temperature of 80° C. before discharging the material.

The calcined material was pulverized to have a particle size of 0.96 μm, pure water was added at a mass ratio of 1:4.5 (calcined material to pure water), and the calcined material in water was ground to have a particle size of 190 nm to obtain a slurry, to which PEG, ferrous sulfate crystals and disodium EDTA were then added and stirred to dissolve, where a molar ratio of the calcined material, PEG, ferrous sulfate crystals, disodium EDTA and sodium borohydride was 1:0.07:0.012:0.02:0.03, and subsequently a sodium borohydride solution and a sodium hydroxide solution were added while stirring, a pH in the process was maintained at 8.9, and then reaction was carried out for 30 min to obtain a product, which was then filtered, and the residue obtained from the filtration was washed and vacuum dried at a temperature of 115° C. and a vacuum degree of −0.09 MPa to have a water mass content of 460 ppm, and vacuum packaged in a constant temperature and humidity dry room to obtain the ferroboron alloy-coated lithium iron phosphate.

The properties of the final lithium iron phosphate are shown in Table 8:

TABLE 8

Properties of lithium iron phosphate product

| Index | Fe | Li | P | B |
|---|---|---|---|---|
| Data | 36.11% | 4.40% | 19.78% | 0.10% |
| Powder resistance | Compacted density | Iron dissolution | Free lithium | pH |
| 0.28 Ω·cm | 2.62 g/mL | 4.8 ppm | 45 ppm | 8.4 |
| First charge capacity at 0.1 C | First discharge capacity at 0.1 C | First discharge efficiency | Mean voltage | Tap density |
| 167 mAh/g | 162 mAh/g | 97.0% | 3.12 V | 1.56 g/mL |
| Capacity retention at −20° C. | Cycle performance at 1 C at ambient temperature | BET | Discharge capacity at 1 C | Discharge capacity at 3 C |
| 91.7% | ≥3500 cycles | 6.87 m²/g | 155 mAh/g | 144 mAh/g |

The product prepared in Example 7 has a low powder resistance of 0.28 Ω·cm which is less than that of conventional carbon-coated lithium iron phosphate by 2 orders of magnitude or more, a high capacity retention rate at −20° C., and excellent rate performance.

It can be seen from the above examples that the method according to the present disclosure eliminates or weakens space charge effect by introducing a stable conductive buffer layer (ferroboron alloy), suppresses the formation of interface layer and reduces interface resistance, and thus is suitable for preparing solid-state battery materials. Because the method does not use raw materials that generate gases to prepare lithium iron phosphate, the obtained product has a higher density, and the final product has a higher compacted density.

What is claimed is:

1. A method for preparing ferroboron alloy-coated lithium iron phosphate, comprising:
preparing ferrous phosphate and lithium phosphate, respectively, then mixing the ferrous phosphate and the lithium phosphate and adding a hydrazine hydrate solution to obtain a mixture which is then subjected to grinding, drying and then calcining to obtain a calcined material, adding pure water to the calcined material and grinding the calcined material in water to obtain a slurry, to which PEG, ferrous sulfate crystals and disodium EDTA are added and stirred to dissolve, then adding a sodium borohydride solution and a sodium hydroxide solution while stirring and maintaining a pH in the process at 8.5-10.5, reacting for 15-30 min to obtain a product, and filtering, washing and vacuum drying the product to obtain the ferroboron alloy-coated lithium iron phosphate.

2. The method according to claim 1, comprising:
step 1 of preparing ferrous phosphate which comprises:
adding ferrous sulfate, urea, phosphoric acid, ammonium dihydrogen phosphate, and hydrazine hydrate together into a sealed reactor to obtain a solution, maintaining a pH of the solution at 1.5-2, and then introducing nitrogen to make an oxygen content in the sealed reactor lower than 1000 ppm; heating up to reach a temperature of 100-110° C. while stirring the solution, reacting at the temperature for 30-60 min while stirring, then releasing pressure and cooling down so that a material temperature is lower than 50° C., discharging, filtering and washing the material to obtain a ferrous phosphate precipitate;
step 2 of preparation of preparing lithium phosphate which comprises:
adding P204 extractant to sulfonated kerosene and mixing them well to obtain an extractant solution, then preparing a lithium hydroxide solution and mixing the lithium hydroxide solution and the extractant solution to obtain a P204-lithium soap, to which a phosphoric acid solution is then added, and stirring and mixing the P204-lithium soap and the phosphoric acid solution to obtain a lithium phosphate precipitate and a P204 extractant solution, which are then subjected to centrifugation to obtain a lithium phosphate precipitate, and washing and drying the lithium phosphate precipitate to obtain lithium phosphate;
step 3 of mixing the ferrous phosphate and the lithium phosphate and adding a hydrazine hydrate solution to obtain a mixture, and grinding the mixture in a sand mill to obtain a slurry having a particle size of 200-350 nm, which is then spray dried to obtain a spray-dried material;
step 4 of calcination which comprises:
putting the spray-dried material into a roller furnace for calcining to obtain a calcined material; and
step 5 of adding pure water to the calcined material, then grinding the calcined material in water in a sand mill to obtain a slurry having a particle size of 150-250 nm, to which PEG, ferrous sulfate crystals and disodium EDTA are added and stirred to dissolve, adding a sodium borohydride solution and a sodium hydroxide solution while stirring and maintaining a pH in the process at 8.5-10.5, then reacting for 15-30 min to obtain a product, filtering the product, and washing and vacuum drying a residue obtained from the filtration to obtain the ferroboron alloy-coated lithium iron phosphate.

3. The method according to claim 2, wherein, in step 1, a molar ratio of ferrous sulfate, urea, phosphoric acid, ammonium dihydrogen phosphate, and hydrazine hydrate is 3:1.2-2.4:0.3-0.6:1.45-1.8:0.1-0.2.

4. The method according to claim 2, wherein, in step 1, the stirring is carried out at a speed of 200-400 r/min; and the heating is carried out at a heating rate of 40-60° C./h to reach a temperature of 85° C., and then at a reduced heating rate of 10-15° C./h.

5. The method according to claim 2, wherein, in step 2, a volume ratio of P204 extractant to sulfonated kerosene is 2-3:7-8; the lithium hydroxide solution has a concentration of 5-10 mol/L; a molar ratio of the lithium added to the P204 extractant is 0.7-0.8:1; the phosphoric acid solution has a concentration of 1.5-2.5 mol/L; during the stirring and mixing of the P204-lithium soap and the phosphoric acid solution, the stirring is carried out at a speed of 300-600 r/min, the P204-lithium soap and the phosphoric acid solution are added into a mixing tank while being stirred over a period of 60-120 min to form a water-in-oil droplet structure having an oil phase which is a continuous phase, the mixing tank having a disk turbine agitator as a stirring paddle, and after the addition is completed, keep stirring and reacting for 30-60 min; and the P204 extractant solution obtained from the centrifugation is recycled.

6. The method according to claim 2, wherein, in step 3, ferrous phosphate and lithium phosphate are mixed at a molar ratio of 1:1.01-1.05; the hydrazine hydrate solution has a concentration of 0.02-0.05 mol/L; a mass ratio of a total mass of the ferrous phosphate and the lithium phosphate to a mass of the hydrazine hydrate solution is 1:2.5-3.5; and
in the spray drying process, the final spray-dried material has a particle size maintained at 3-8 μm, and a water mass content of less than 0.5%.

7. The method according to claim 2, wherein, in step 4, the calcination is carried out by heating up at a heating rate of 50-100° C./h to reach a temperature of 650-700° C., holding the temperature for 3-4 hours, and then cooling down at a cooling rate of 100-150° C./h until the material temperature is less than or equal to 80° C. before discharging the material.

8. The method according to claim 2, wherein, in step 5, the calcined material is pulverized to have a particle size ≤1 μm before entering the sand mill.

9. The method according to claim 2, wherein, in the process of adding pure water to the calcined material, a mass ratio of the calcined material to the pure water is 1:4-5; and a molar ratio of the calcined material, PEG, ferrous sulfate crystals, disodium EDTA and sodium borohydride is 1:0.05-0.1:0.012-0.018:0.01-0.02:0.02-0.04.

10. The method according to claim 2, wherein, in step 5, the residue is vacuum dried at a temperature of 80-120° C. and a vacuum degree of −0.09 ~ −0.08 MPa to have a water mass content of less than 500 ppm, and then vacuum packaged in a constant temperature and humidity dry room.

* * * * *